B. F. HENTHORN.
FISH BAIT CONTAINER.
APPLICATION FILED FEB. 13, 1918.
1,278,146.
Patented Sept. 10, 1918.
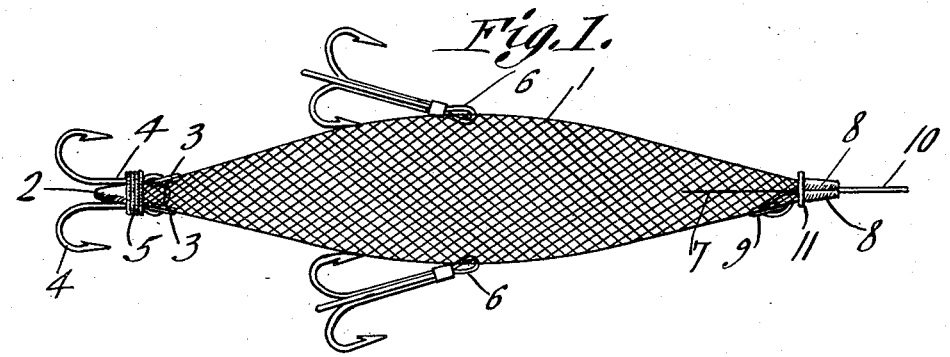
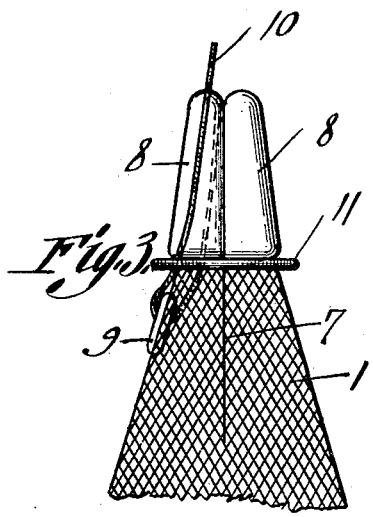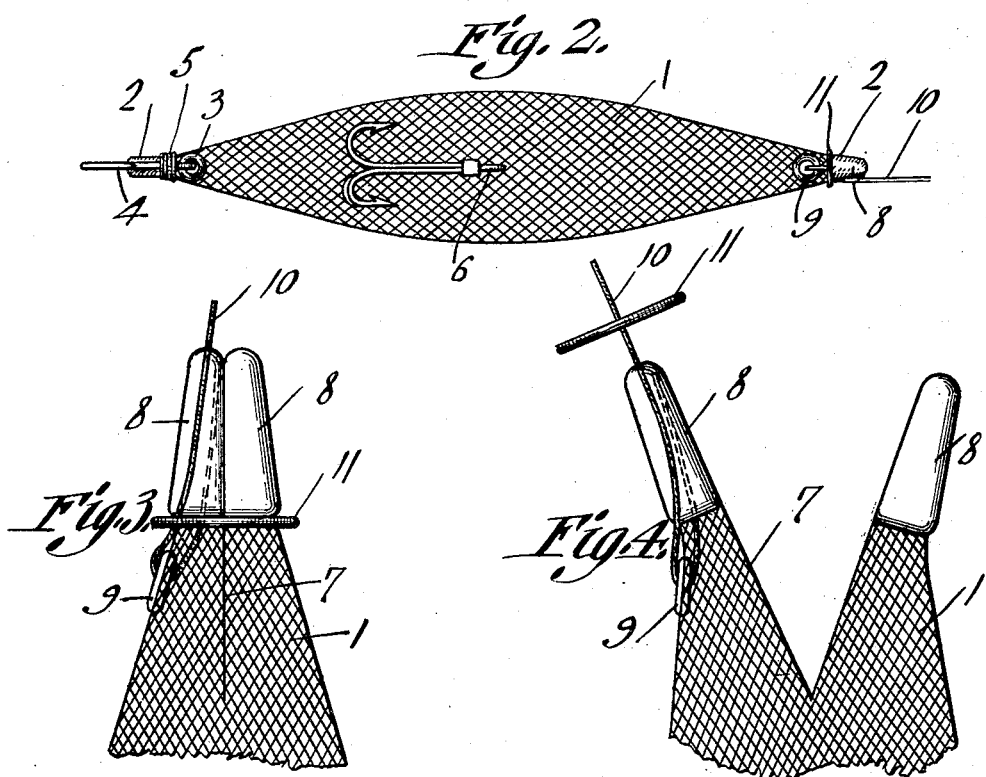
B. F. Henthorn, Inventor

UNITED STATES PATENT OFFICE.

BENJAMINE F. HENTHORN, OF OSAWATOMIE, KANSAS.

FISH-BAIT CONTAINER.

1,278,146.  Specification of Letters Patent.  Patented Sept. 10, 1918.

Application filed February 13, 1918. Serial No. 216,875.

*To all whom it may concern:*

Be it known that I, BENJAMINE F. HENTHORN, a citizen of the United States, residing at Osawatomie, in the county of Miami and State of Kansas, have invented a new and useful Fish-Bait Container, of which the following is a specification.

The subject of this invention is a fish bait container intended for use on a fishing line, and the objects of the invention are; first, to provide a container for live bait, second, to provide a container which will permit fish to be attracted by the bait but will preclude them from getting the bait, third, to provide a container which will keep the bait alive and in good condition, fourth, to provide a bait container on which hooks may be hung, fifth, to provide a simple, durable and efficient container.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawing, wherein;

Figure 1 is a plan view of the container;

Fig. 2 is a side elevation of the same;

Fig. 3 is an enlarged fragmentary detail showing the mouth end of the device in elevation;

Fig. 4 is a similar view showing the mouth opened.

Referring to the drawing by numerals of reference:—

In carrying out the invention a receptacle 1 is provided which is made of mesh, preferably wire, the strands of which are drawn together at each end to form a cigar shaped structure, as shown.

At the rear end of the receptacle, the strands are clamped by metallic caps 2 which are firmly pressed about the strands or otherwise secured thereon.

Eyelets 3 are also clamped in the mesh at this end and hooks 4 are secured to said eyelets and may be bound firmly in place by the binding wire 5 or otherwise.

At opposite sides of the receptacle and at about the center thereof are hung hooks 6, preferably multipronged as shown.

At the forward end the receptacle is slit or divided as indicated at 7 to provide a mouth or opening. The strands at this end are likewise clamped by caps 8 which are squeezed or otherwise clamped about the ends of the strands.

Eyelets 9 are also provided in the material at this end of the receptacle and through one of these eyelets is passed an end of the line 10 which is suitably knotted or otherwise secured to the receptacle.

A ring 11 slips over this end to keep the mouth closed and prevent the bait from escaping.

The device is attached to the fishing line as described and the ring 11 is drawn off the end and the mouth opened. A minnow, crawfish, or other bait may now be inserted in the receptacle and the ring slipped back in place.

The hook is now cast into the water in the usual way. The minnow, or crawfish, being in the water, will be kept alive and active. The line may be fastened and left without danger of the bait being nibbled off the hook.

Having thus described the invention, what is claimed as new and sought by Letters Patent, is;—

A bait container, including an elongated receptacle formed of wire mesh, eyelets at one end of the container, hooks attached to the eyelets, the other end of the container divided for a short distance longitudinally to form an opening, binders secured on the mesh at either side of the opening, means for securing a line to the mesh at one side of the opening, and a ring adapted to encircle the binders and close the opening.

In testimony that I claim the foregoing as my own, I have hereto affixed my signature in the presence of two witnesses.

BENJAMINE F. HENTHORN.

Witnesses:
  I. E. STEWART,
  E. C. PACE.

Copies of this patent may be obtained for five cents each, by addressing the "Commissioner of Patents. Washington, D. C."